US011238409B2

(12) United States Patent
Gupta et al.

(10) Patent No.: US 11,238,409 B2
(45) Date of Patent: Feb. 1, 2022

(54) TECHNIQUES FOR EXTRACTION AND VALUATION OF PROFICIENCIES FOR GAP DETECTION AND REMEDIATION

(71) Applicant: Oracle International Corporation, Redwood Shores, CA (US)

(72) Inventors: Manisha Gupta, San Ramon, CA (US); Ananth Venkata, San Ramon, CA (US); Vikas Agrawal, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 143 days.

(21) Appl. No.: 16/147,234

(22) Filed: Sep. 28, 2018

(65) Prior Publication Data

US 2019/0102741 A1 Apr. 4, 2019

Related U.S. Application Data

(60) Provisional application No. 62/718,760, filed on Aug. 14, 2018, provisional application No. 62/565,396, filed on Sep. 29, 2017.

(51) Int. Cl.
*G06Q 10/00* (2012.01)
*G06Q 10/10* (2012.01)
(Continued)

(52) U.S. Cl.
CPC ............ *G06Q 10/105* (2013.01); *G06N 3/02* (2013.01); *G06Q 10/06* (2013.01);
(Continued)

(58) Field of Classification Search
CPC .. G06Q 10/105; G06Q 10/0635; G06Q 10/10; G06Q 10/06; G06Q 10/1053; G06N 3/02
See application file for complete search history.

(56) References Cited

U.S. PATENT DOCUMENTS 5,642,519 A 6/1997 Martin
5,717,828 A 2/1998 Rothenberg
(Continued)

FOREIGN PATENT DOCUMENTS

EP 3309689 4/2018
JP 2013109364 6/2013
(Continued)

OTHER PUBLICATIONS

K. N. Ramamurthy, M. Singh, M. Davis, J. A. Kevern, U. Klein and M. Peran, "Identifying Employees for Re-skilling Using an Analytics-Based Approach," 2015 IEEE International Conference on Data Mining Workshop (ICDMW), 2015, pp. 345-354 (Year: 2015).*
(Continued)

*Primary Examiner* — Rutao Wu
*Assistant Examiner* — Tyrone E Singletary
(74) *Attorney, Agent, or Firm* — Kilpatrick Townsend & Stockton LLP

(57) ABSTRACT

Gaps in proficiencies may be identified within an enterprise. Understanding gaps in the existing workforce may help inform training, hiring, and firing decisions to ensure successful completion of the upcoming projects and deadlines. Using a multi-level model for each proficiency that accounts for enterprise needs as well as hiring, retraining, and the like, a relationship between proficiencies, projects, and employees over time may be generated as a multi-dimensional temporal model. The temporal model may be simulated to forecast gaps in proficiencies of the employed workforce. Recommendations regarding retraining, hiring, and termination can be made to help users remedy the deficiencies. Additionally, the proficiencies most valuable to the enterprise may be determined using a catalog of proficiencies to cluster the proficiencies into proficiency clusters for each job or job category and the proficiencies scored. Employees and
(Continued)

candidates may be scored using the clusters to inform hiring, firing, and retraining decisions.

15 Claims, 10 Drawing Sheets

(51) Int. Cl.
*G06Q 10/06* (2012.01)
*G06N 3/02* (2006.01)

(52) U.S. Cl.
CPC ......... *G06Q 10/0635* (2013.01); *G06Q 10/10* (2013.01); *G06Q 10/1053* (2013.01)

(56) References Cited

U.S. PATENT DOCUMENTS

| | | | |
|---|---|---|---|
| 5,754,681 A | 5/1998 | Watanabe et al. | |
| 5,966,690 A | 10/1999 | Fujita et al. | |
| 6,995,768 B2 | 2/2006 | Jou et al. | |
| 7,801,769 B1 | 9/2010 | Kelly et al. | |
| 7,869,989 B1 | 1/2011 | Harvey et al. | |
| 8,200,527 B1* | 6/2012 | Thompson | G06Q 10/06398 705/7.39 |
| 8,620,716 B2 | 12/2013 | Nicholls et al. | |
| 8,824,337 B1 | 9/2014 | Geisberger | |
| 9,208,231 B1 | 12/2015 | Upstill et al. | |
| 9,911,094 B1 | 3/2018 | Chen et al. | |
| 10,210,548 B1 | 2/2019 | Wai | |
| 2006/0046232 A1 | 3/2006 | Peter | |
| 2006/0241923 A1 | 10/2006 | Xu et al. | |
| 2008/0124686 A1 | 5/2008 | Forman | |
| 2008/0199075 A1 | 8/2008 | Gokturk et al. | |
| 2008/0313000 A1* | 12/2008 | Degeratu | G06Q 10/06 705/319 |
| 2009/0083019 A1* | 3/2009 | Nasle | G06F 30/18 703/18 |
| 2009/0132450 A1 | 5/2009 | Schlottmann | |
| 2009/0276296 A1* | 11/2009 | Spriegel | G06Q 10/0639 705/7.38 |
| 2010/0036606 A1 | 2/2010 | Jones | |
| 2010/0049538 A1 | 2/2010 | Frazer et al. | |
| 2010/0223212 A1* | 9/2010 | Manolescu | G09B 7/00 706/12 |
| 2010/0233663 A1* | 9/2010 | Pennington | G09B 19/00 434/219 |
| 2011/0131082 A1* | 6/2011 | Manser | G06Q 10/06 705/7.42 |
| 2011/0161139 A1* | 6/2011 | Maheshwari | G06Q 10/06 705/7.42 |
| 2011/0261049 A1 | 10/2011 | Cardno et al. | |
| 2011/0311129 A1 | 12/2011 | Milanfar et al. | |
| 2012/0053995 A1 | 3/2012 | D' Albis et al. | |
| 2012/0066017 A1* | 3/2012 | Siegel | G06Q 10/06 705/7.14 |
| 2012/0102396 A1 | 4/2012 | Arksey et al. | |
| 2012/0158301 A1 | 6/2012 | Schilling et al. | |
| 2013/0018824 A1 | 1/2013 | Ghani et al. | |
| 2013/0024249 A1 | 1/2013 | Zohar et al. | |
| 2013/0261965 A1 | 10/2013 | Delling et al. | |
| 2013/0261966 A1 | 10/2013 | Wang et al. | |
| 2014/0157142 A1 | 6/2014 | Heinrich et al. | |
| 2014/0258189 A1 | 9/2014 | Schmidt | |
| 2014/0282261 A1 | 9/2014 | Ranz et al. | |
| 2014/0358602 A1 | 12/2014 | Jones | |
| 2015/0012471 A1 | 1/2015 | Efrat et al. | |
| 2015/0113056 A1 | 4/2015 | Srinivasan et al. | |
| 2015/0120608 A1 | 4/2015 | Leftwich et al. | |
| 2015/0206443 A1* | 7/2015 | Aylesworth | G06Q 50/20 434/322 |
| 2015/0229661 A1 | 8/2015 | Balabine et al. | |
| 2015/0363798 A1 | 12/2015 | Aihara et al. | |
| 2016/0057207 A1 | 2/2016 | Li et al. | |
| 2016/0092530 A1 | 3/2016 | Jakubiak et al. | |
| 2016/0170610 A1 | 6/2016 | Bertram et al. | |
| 2016/0171540 A1 | 6/2016 | Mangipudi et al. | |
| 2016/0239768 A1 | 8/2016 | Jones | |
| 2016/0379083 A1 | 12/2016 | Sala et al. | |
| 2017/0116624 A1 | 4/2017 | Moore et al. | |
| 2017/0124581 A1 | 5/2017 | Wilson et al. | |
| 2017/0243140 A1 | 8/2017 | Achin et al. | |
| 2017/0344927 A1* | 11/2017 | Coletta | G06Q 10/063112 |
| 2017/0372695 A1 | 12/2017 | Takei et al. | |
| 2018/0046926 A1 | 2/2018 | Achin et al. | |
| 2018/0046987 A1* | 2/2018 | Goren | G06Q 10/1053 |
| 2018/0060744 A1 | 3/2018 | Achin et al. | |
| 2018/0114128 A1 | 4/2018 | Libert et al. | |
| 2018/0253655 A1* | 9/2018 | Wang | G06F 16/27 |
| 2018/0268082 A1 | 9/2018 | Latzina | |
| 2018/0276861 A1 | 9/2018 | Wright et al. | |
| 2018/0349474 A1 | 12/2018 | Smith et al. | |
| 2018/0365229 A1* | 12/2018 | Buhrmann | G06F 40/216 |
| 2019/0066056 A1* | 2/2019 | Gomez | G06Q 10/06393 |
| 2019/0104041 A1 | 4/2019 | Tabak et al. | |
| 2019/0156216 A1 | 5/2019 | Gupta et al. | |
| 2019/0186928 A1 | 6/2019 | Blandin et al. | |
| 2019/0188289 A1 | 6/2019 | Suzuki et al. | |
| 2019/0188605 A1 | 6/2019 | Zavesky et al. | |
| 2019/0197605 A1 | 6/2019 | Sadler et al. | |
| 2019/0220153 A1 | 7/2019 | Kidron et al. | |
| 2019/0268233 A1 | 8/2019 | Singh | |
| 2019/0306184 A1 | 10/2019 | Oliner et al. | |
| 2019/0317739 A1 | 10/2019 | Turek et al. | |
| 2020/0065857 A1 | 2/2020 | Lagi et al. | |
| 2020/0074295 A1* | 3/2020 | O'Donncha | G06K 9/6256 |

FOREIGN PATENT DOCUMENTS

| | | |
|---|---|---|
| KR | 102148372 | 8/2020 |
| WO | 2021021328 | 2/2021 |

OTHER PUBLICATIONS

M. Singh, K. N. Ramamurthy and S. Vasudevan, "Propensity modeling for employee Re-skilling," 2017 IEEE Global Conference on Signal and Information Processing (GlobalSIP), 2017, pp. 893-897 (Year: 2017).*
U.S. Appl. No. 16/140,153, First Action Interview Office Action Summary dated Jul. 1, 2020, 27 pages.
U.S. Appl. No. 16/140,153, First Action Interview Pilot Program Pre-Interview Communication dated May 4, 2020, 26 pages.
Runge, et al., "Detecting Causal Associations in Large Nonlinear Time Series Datasets", Cornell University Library, Available online at: https://arxXv.org/abs/1702.07007, Feb. 22, 2017, 46 pages.
Tiunov; Pavel, "Time Series Anomaly Detection Algorithms", Stats and Bots, Available online at https://blog.statsbot.co/time-series-anomaly-detection-algorithms-1cef5519aef2, Jun. 8, 2017, 8 pages.
International Application No. PCT/US2019/053576, International Search Report and Written Opinion dated Dec. 12, 2019, 12 pages.
U.S. Appl. No. 16/145,963, First Action Interview Pilot Program Pre-Interview Communication dated Aug. 5, 2020, 5 pages.
"Episodic Memory", Wikipedia, Available Online at: https://en.wikipedia.org/wiki/Episodic_memory, last modified Mar. 24, 2018, 9 pages.
"Win-Loss Analytics", Wikipedia, , Available Online at: https://web.archive.org/web/20161228213605/https://en.wikipedia.org/wiki/Win%E2%80%93loss_analytics, Last modified Jan. 22, 2016, 1 page.
Runge et al., "Detecting and Quantifying Causal Associations in Large Nonlinear Time Series Datasets", Science Advances, vol. 5, Nov. 27, 2019, 15 pages.
U.S. Appl. No. 16/580,746, Non-Final Office Action dated Apr. 29, 2021, 40 pages.
Lundberg et al., A Unified Approach to Interpreting Model Predictions, 31st Conference on Neural Information Processing Systems, Nov. 25, 2017, 10 pages.
International Application No. PCT/US2019/053576, International Preliminary Report on Patentability dated Apr. 8, 2021, 9 pages.

(56) References Cited

OTHER PUBLICATIONS

U.S. Appl. No. 16/145,963, Final Office Action dated Jan. 15, 2021, 24 pages.
U.S. Appl. No. 16/145,963, First Action Interview Office Action Summary dated Sep. 25, 2020, 6 pages.
U.S. Appl. No. 16/140,153, Final Office Action dated Dec. 7, 2020, 27 pages.
U.S. Appl. No. 16/586,347, First Action Interview Pilot Program Pre-Interview Communication dated Feb. 9, 2021, 7 pages.
Foote; Keith, *A Brief History of Machine Learning*, Dataversity, Available Online at https://www.dataversity.net/a-brief-history-of-machine-learning, Mar. 26, 2019, 8 pages.
Tch; Andrew, *The Mostly Complete Chart of Neural Networks, Explained*, Towards Data Science, Available Online at: https://towardsdatascience.com/the-mostly-complete-chart-of-neural-networks-explained-3fb6f2367464, Aug. 4, 2017, 28 pages.
U.S. Appl. No. 16/140,153, Non-Final Office Action dated Sep. 9, 2021, 12 pages.
U.S. Appl. No. 16/580,746, Final Office Action dated Aug. 11, 2021, 89 pages.
U.S. Appl. No. 16/586,347, Final Office Action dated Sep. 17, 2021, 22 pages.
U.S. Appl. No. 16/145,963 received a Non-final Office Action dated Oct. 29, 2021, 34 pages.

\* cited by examiner

Hiring Trends

| Proficiency | Headcount need | Hiring Rate | Attrition Rate | Forecasted Hiring Gap | Recommendation |
|---|---|---|---|---|---|
| Java | 50 | 8 | 3 | -5.5 | HIRE |
| Big Data | 30 | 10 | 6 | -14 | HIRE AT PREMIUM |
| Data Warehousing | 35 | 1 | 1 | -9 | SIT STEADY |
| Quality Assurance | 20 | 2 | 6 | 14 | RETRAIN |
| PL/SQL | 20 | 0 | 0 | 5 | NO BONUS |

FIG. 6

TECHNIQUES FOR EXTRACTION AND VALUATION OF PROFICIENCIES FOR GAP DETECTION AND REMEDIATION

CROSS-REFERENCES TO RELATED APPLICATIONS

This Application claims priority under 35 U.S.C. § 119 to U.S. Provisional Patent Application No. 62/565,396, filed Sep. 29, 2017, entitled "SYSTEMS AND METHODS FOR USING SKILLS AS A CURRENCY," and to U.S. Provisional Patent Application No. 62/718,760, filed Aug. 14, 2018, entitled "TECHNIQUES FOR EXTRACTION AND VALUATION OF PROFICIENCIES FOR GAP DETECTION AND REMEDIATION," each of which is incorporated herein in its entirety for all purposes.

BACKGROUND

Understanding the relative value of proficiencies to an enterprise may be critical to success. Without a clear understanding of what the enterprise needs with respect to the current business of the enterprise and upcoming projects, it is difficult or impossible for the enterprise to ensure the employees are qualified in the correct proficiencies. Most enterprises rely upon human knowledge to inform hiring and training. For example, managers and human resources (HR) personnel know of specific projects and tasks that require staffing, but this misses the global picture of all that is needed within the enterprise, risks created by employee movements, and lack of training in skills needed. Further, the managers and/or HR personnel may not have in-depth information about the proficiencies of all employees. Finally, this human-based knowledge is inconsistent in that evaluating which proficiencies are most important may differ between the individuals (e.g., the manager may believe knowing Java is the only important skill for a candidate while the HR personnel believes leadership is also important).

BRIEF SUMMARY

The present disclosure relates generally to analyzing large data sets. More particularly, techniques are described automatically analyzing employees and/or hiring candidates based on their proficiencies, identify gaps in an enterprise workforce, and provide concrete data and recommendations regarding hiring decisions and retraining of existing employees. Various inventive embodiments are described herein, including methods, systems, non-transitory computer-readable storage media storing programs, code, or instructions executable by one or more processors, and the like.

In certain embodiments, the ability of an enterprise to execute may be analyzed. The ability to execute may include understanding gaps in the existing workforce to ensure successful completion of the upcoming projects and deadlines. In some enterprises, understanding the short-term gaps are important, for example, hospitals need to ensure sufficient nurses, doctors, and other staff are available for the next shift. Other example enterprise types that have short-term gap needs include factories, retail stores, and the hospitality industry. In some enterprises, understanding the long-term gaps are important, for example, software enterprises need to ensure sufficient developers are available to meet the next release date. Using a multi-level model for each proficiency that accounts for enterprise needs as well as hiring, retraining, and the like, a relationship between proficiencies, projects, and employees over time may be generated as a multi-dimensional temporal model. The multi-dimensional temporal model may be simulated to forecast (predict) gaps in proficiencies of the employed workforce. In addition to identifying gaps, recommendations regarding retraining, hiring, and the like can be made based on further analysis to help users remedy the deficiencies.

In some embodiments, employee competence or values may be generated based on enterprise specific data. The proficiencies most valuable to the enterprise may be determined using a catalog of proficiencies to cluster the proficiencies into proficiency clusters for each job or job category. The values of the proficiencies in each cluster may be scored and/or weighted to generate values for proficiencies that are associated with specific jobs or job categories. Existing employees and/or candidates for an enterprise may be analyzed using the proficiency clusters and scores to generate a score for the employee or candidate. Scores for candidates may be used to help inform hiring decisions. Scores for employees may be used to identify gaps that may be remedied with hiring, termination, and/or retraining. Recommendations may further be provided to help users remedy the deficiencies.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method performed by a computer system. The computer system may generate multi-level models for each proficiency (i.e., skill) desired or needed in an enterprise. The computer system may further generate a multi-dimensional temporal model based on the multi-level models. The computer system may use the multi-dimensional temporal model to identify gaps in proficiencies within the enterprise. The computer system may generate recommendations to remedy the gaps. The recommendations may be generated using boundary condition constrained simulations run on top of the multi-dimensional temporal model simulation. The recommendations may be sent to a user device for display to a user. Other embodiments of this aspect include corresponding computer systems, apparatus, and computer programs recorded on one or more computer storage devices, each configured to perform the actions of the methods.

Implementations may include one or more of the following features. In some embodiments, generating the multi-level models includes using the equivalent of a partial differential equations based gap computation, which in some instantiations could be approximated using parabolic or hyperbolic convolutional neural networks. In some embodiments, identifying the gaps in proficiencies includes predicting the number of employees to retrain. In some embodiments, a risk to execution based on the gaps may be calculated. In some embodiments, the multi-level models are generated using a goals at various levels of the enterprise in combination with competitive analysis and market availability of skills. In some embodiments, the multi-level models define enterprise needs for proficiencies at one or more levels of competence. Implementations of the described techniques may include hardware, a method or process, or computer software on a computer-accessible medium.

Another general aspect includes another method executed by a computer system. The computer system may extract data from one or more data sources to generate a proficiencies catalog including a listing of proficiencies tied to a proficiencies ontology. The computer system may further create proficiency clusters from the proficiencies in the listing of proficiencies in the proficiencies catalog, where each proficiency in a proficiency cluster is related to the other proficiencies in the proficiency cluster. Labels may be assigned to each proficiency cluster, where each label identifies an associated job family. The computer system may further analyze a candidate using the proficiency clusters and associated labels.

Implementations of this aspect may include one or more of the following features. In some embodiments, the proficiency clusters are created using, for example, k-means clustering. In some embodiments, the proficiencies in the proficiency clusters are weighted using, for example, Mahalanobis distance normalized scores of value and association with job families and projects, and similarity scores with other proficiencies. In some embodiments, the proficiencies within each proficiency cluster are weighted based on enterprise needs in projects. Analyzing the candidate can include receiving a resume of the candidate and extracting proficiencies of the candidate from the resume. The candidate may be scored using the scores of the proficiencies within each proficiency cluster to assign a score or value to the candidate, based on value of proficiencies to given job families or projects. In some embodiments, the proficiencies are scored within each proficiency cluster based on enterprise needs. Analyzing the candidate, who is a current employee, may include assigning a value to the current employee based on proficiencies of the current employee using the scores of the proficiencies within each proficiency cluster. Implementations of the described techniques may include hardware, a method or process, or computer software on a computer-accessible medium.

The foregoing, together with other features and embodiments will become more apparent upon referring to the following specification, claims, and accompanying drawings.

BRIEF DESCRIPTION OF THE DRAWINGS

FIGS. 4-7 depict user interfaces according to certain embodiments.

DETAILED DESCRIPTION

Figure 1:
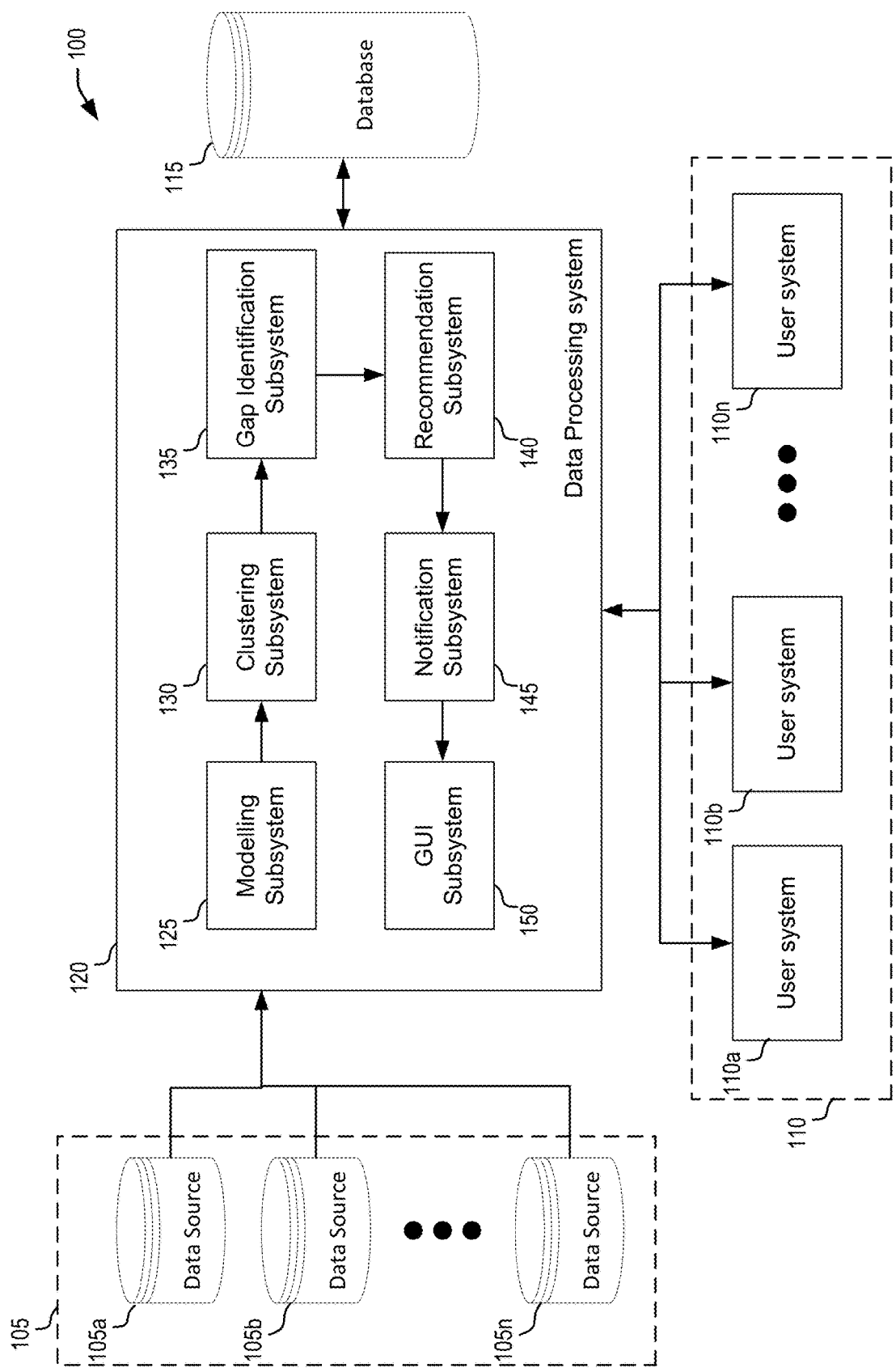
FIG. 1 is a simplified block diagram of a distributed environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to analyzing large data sets. More particularly, techniques are described automatically analyzing employees and/or hiring candidates based on their proficiencies, identify gaps in an enterprise workforce, and provide concrete data and recommendations regarding hiring decisions and retraining of existing employees. Various inventive embodiments are described herein, including methods, systems, non-transitory computer-readable storage media storing programs, code, or instructions executable by one or more processors, and the like.

In certain embodiments, the ability of an enterprise to execute may be analyzed. The ability to execute may include understanding gaps in the existing workforce to ensure successful completion of the upcoming projects and deadlines. In some enterprises, understanding the short-term gaps are important, for example, hospitals need to ensure sufficient nurses, doctors, and other staff are available for the next shift. Other example enterprise types that have short-term gap needs include factories, retail stores, and the hospitality industry. In some enterprises, understanding the long-term gaps are important, for example, software enterprises need to ensure sufficient developers are available to meet the next release date. Using a multi-level model for each proficiency that accounts for enterprise needs as well as hiring, retraining, and the like, a relationship between proficiencies, projects, and employees over time may be generated as a multi-dimensional temporal model. The multi-dimensional temporal model may be simulated to forecast (predict) gaps in proficiencies of the employed workforce. In addition to identifying gaps, recommendations regarding retraining, hiring, and the like can be made based on further analysis to help users remedy the deficiencies.

In some embodiments, employee competence or values may be generated based on enterprise specific data. The proficiencies most valuable to the enterprise may be determined using a catalog of proficiencies to cluster the proficiencies into proficiency clusters for each job or job category. The values of the proficiencies in each cluster may be scored and/or weighted to generate values for proficiencies that are associated with specific jobs or job categories. Existing employees and/or candidates for an enterprise may be analyzed using the proficiency clusters and scores to generate a score for the employee or candidate. Scores for candidates may be used to help inform hiring decisions. Scores for employees may be used to identify gaps that may be remedied with hiring, termination, and/or retraining. Recommendations may further be provided to help users remedy the deficiencies.

FIG. 1 is a simplified block diagram of a distributed environment 100 incorporating an exemplary embodiment. Distributed environment 100 may comprise multiple systems communicatively coupled to each other via one or more communication networks, such as network 510 or network 510 of FIGS. 5 and 6. The systems in FIG. 1 include one or more data processing systems (automated signal and anomaly processing system) 120, one or more user systems 110, one or more data sources 105, and a database 115 (or data store, in general) communicatively coupled to each other via one or more communication networks. Distributed environment 100 depicted in FIG. 1 is merely an example and is not intended to unduly limit the scope of claimed embodiments. One of ordinary skill in the art would recognize many possible variations, alternatives, and modifications. For example, in some implementations, distributed environment 100 may have more or fewer systems or components than those shown in FIG. 1, may combine two or more systems, or may have a different configuration or arrangement of systems.

Data sources 105, may include any number of data sources 105 that store or provide data for an enterprise. Each of the data sources 105 may store or provide data relevant for analyzing proficiency gaps relevant to the enterprise. For example, one or more data sources 105 may include data regarding sales (e.g., a sales system), revenue, inventory (e.g., an inventory control system), headcount (e.g., attrition, hiring, and other employment related information), supply (e.g., a supply chain management system), department level data, data regarding upcoming projects, and the like. Additional data within data sources 105 may include performance reviews, project reviews, peer review, customer reviews, social media data, data regarding patents, publications, and so forth.

User systems 110 may be any suitable computer systems that may be used by a user to interact with data processing system 120. For example, proficiency gap results generated by data processing system 120 may be transmitted to a user system 110 and may be output to a user via a graphical user interface (GUI) displayed by the user system 110. A user may also use a user system 110 to provide inputs to data processing system 120, where the inputs may be used by data processing system 120 as parameters for the analysis performed by data processing system 120. For example, the user may select specific parameters or configurations to modify the displayed information in the GUI. User systems 110 may be computer system 1000 of FIG. 10. Although three user systems 110 are shown in FIG. 1, this is not intended to be limiting in any manner. In alternative embodiments, any number of user systems 110 may be supported by distributed system 100.

Database 115 may be any suitable database (or data store) for storing data used by data processing system 120 for performing proficiency gap analysis and recommendations. In certain embodiments, the results of the analysis may be stored in database 115. In certain embodiments, data used to generate GUIs by GUI subsystem 150 and/or notifications generated by notification subsystem 145 may be stored in database 115.

Figure 8:
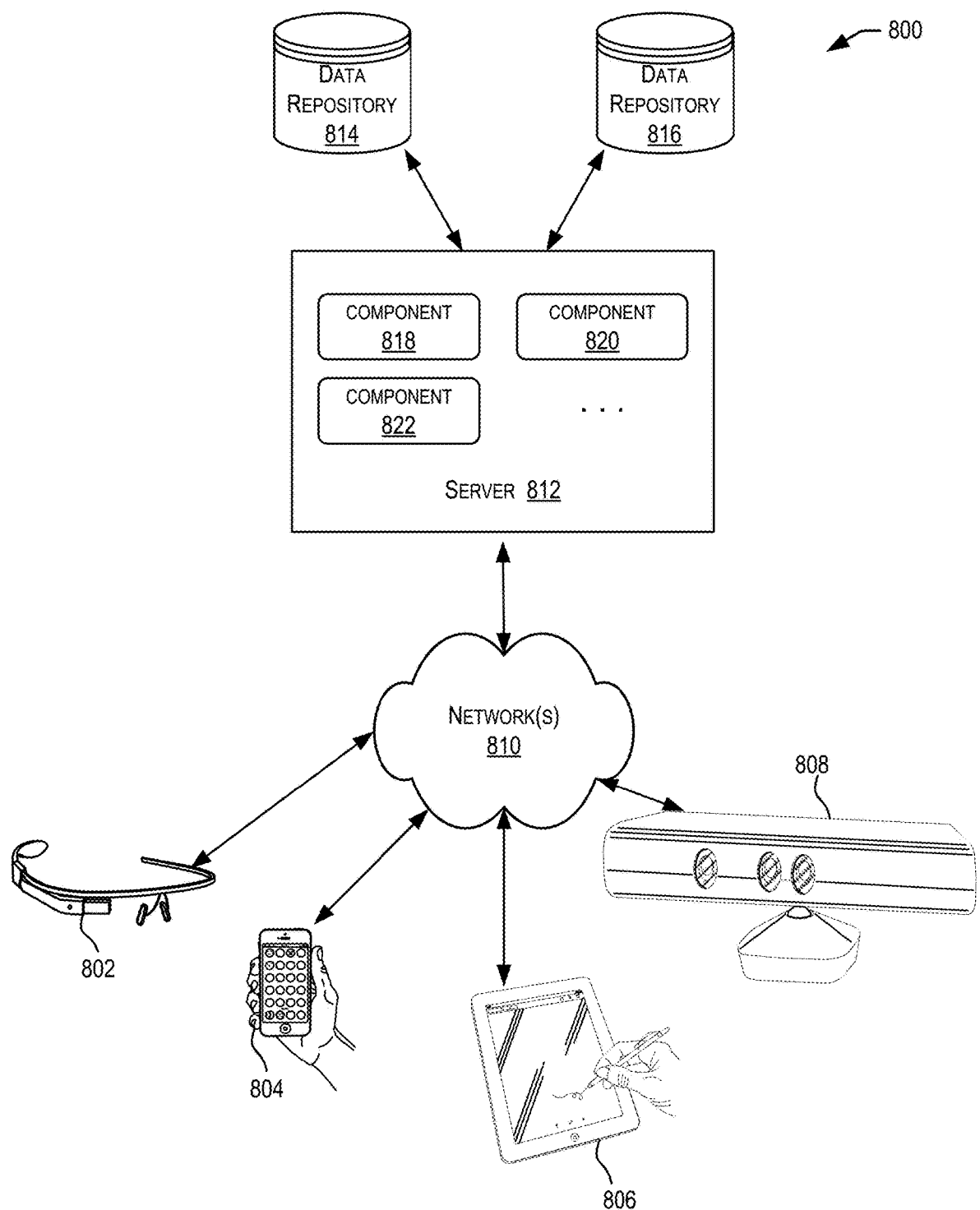
FIG. 8 depicts a simplified diagram of a distributed system for implementing an embodiment.

Data processing system 120 may be implemented using one or more suitable computer systems, such as, for example, one or more of computer system 800 of FIG. 8. In the embodiment depicted in FIG. 1, data processing system 120 includes a modelling subsystem 125, clustering subsystem 130, gap identification subsystem 135, recommendation subsystem 140, notification subsystem 145, and graphical user interface subsystem 150. While specific subsystems are depicted within data processing system 120, more or fewer subsystems may be used to incorporate the described functionality without impacting the scope of this disclosure.

Modelling subsystem 125 may be implemented using software executed by one or more processors, hardware, firmware, or combinations thereof, and is configured to collect data from data sources 105 and generate models used to predict proficiency gaps. Modelling subsystem 125 may generate, using data from data sources 105, multi-level models for each proficiency in an enterprise. For example, proficiencies (i.e., skills) may be defined by an enterprise or identified as needed within an enterprise. The proficiencies may be identified by analyzing the enterprise data regarding upcoming projects, goals (including enterprise goals, department level goals, and the like), timelines, and so forth. The proficiencies may be identified using named entity recognition in natural language processing, for example. Once the proficiencies are identified, a weighted graph of related skills based on term frequencies and inverse document frequencies may be generated. The weighted graph may be started from a taxonomy of proficiencies available in the public domain (such as, for example, a plain list of proficiencies available from LinkedIn®) and classified into an industry-specific or enterprise-specific ontology where available in some embodiments. The proficiencies needed to meet the goals and complete the projects within the timelines may be identified. A multi-level model for each proficiency may be generated. The models may use a combination of corporate goals, department levels goals, project level goals and corporate competitive analysis to determine requirements for proficiencies at different levels of competence. For example, corporate goals may include or be identified using corporate project data, contracts for knowledge services, information technology services, operations models, and the like. Neural networks models such as parabolic or hyperbolic convolutional neural network equivalent to partial differential equations-based proficiency gap computations may be used to derive instantaneous gaps (what is needed versus what is available). The risk of not being able to execute (successfully complete) upcoming projects within the enterprise may also be determined. For a given proficiency, the temporal risk computation may be approximated by a deep neural network (including, for example, Recurrent Neural Networks with the subunit being Long Short Term Memory (LSTM) networks). These deep neural networks may be used as a generative simulation to provide data over the known boundary conditions to drive model parameter fitting for neural network models that approximate the partial differential equations, such as parabolic or hyperbolic convolutional neural networks. Functional relationships are modeled as an approximation in this manner, but exact integrals and derivatives are not computable in closed form. Stated differently, the neural network model described above approximates the relationships using local gradients and hypersurface integrals. The function represents the integrated proficiency requirements estimated from corporate goals and objectives, department level goals and objectives, project level goals and objectives, and corporate competitive analysis. Execution of the model may provide the proficiencies needed to meet the goals. Further the proficiencies needed over time and the proficiency availability of the proficiency over time as a function of current known availability may be provided. The current known availability may be weighted by competence based on performance reviews of employees having the proficiency. The current known availability may further be augmented by hiring, retraining, attrition, and employee transfer information. The day-to-day (or week-to-week, month-to-month, and so forth) changes based on illness, leave, temporary workers, and the like may also be incorporated to obtain an accurate prediction of proficiency gaps. The output of the modeling sub-system 125 may be, for example, a multi-level model that, when simulated, defines the need for each proficiency at each level of the enterprise, tracks the gaps, and identifies where there is hiring and retraining needed, over multiple time periods including the present and, for example, several quarters ahead.

Modelling subsystem 125 may use the multi-level models for each proficiency to generate a multi-dimensional temporal graphical model by combining the multi-level models. The multi-dimensional temporal graphical model has weights in the edges of the graph that may themselves be time-varying (i.e., the relationships between different proficiencies, projects and job types changes over time, and their relative strengths vary depending on competition, product demand and enterprise priorities). The multi-dimensional temporal model may define the relationship between proficiencies, projects, and employees, with temporal and causal relationships. Executing or simulating the temporal model may predict what happens to a given project if a proficiency is missing or lacking, for example. As another example, the model may be used to predict the availability of proficiencies when certain employees are not available. As yet another example, the model may be used to predict the utilization of certain employees if a given project is not available to work on. As another example, the model may be used to predict the success of a given project if sufficient employees with a given proficiency are not available.

There are multiple levels in these models as there are multiple levels of clusters of proficiencies, projects, and job types, and their mutual relationships. For example, a proficiency like Java may have many sub-skills (sub-proficiencies) which cluster together under different sub-skills clusters such as proficiency in several tools for cryptography (or networking or user interface or application servers or machine learning or any other proficiency), and each of these clusters have their own sub-clusters such as under machine learning there are sub-clusters of statistical APIs, clustering APIs, neural network APIs, data mining APIs, recommendation system APIs, forecasting APIs, and so forth. In some embodiments, a proficiency such as Java, for example, may cluster with other proficiencies like Apache Tomcat Server, Weblogic Server, and PL/SQL in a cluster (a super-cluster or set of sub-clusters) that is closest to the Database Programmer job cluster, which may have connections with other proficiency clusters that represent other proficiencies and proficiency clusters, such as those for different technology stacks, in this example. Similarly, projects clusters may be generated by the kinds of proficiency clusters they are associated with at multiple levels, and with job type levels.

Proficiencies, projects, and job types may vary by multiple dimensions including, for example, lines of business, location, size of business, levels of proficiency, cost of proficiency in the local market, availability of proficiency in the local market, timelines of projects, and availability of the proficiency internally.

The multi-level model creation may begin with a proficiency, projects, and job types catalog (i.e., a catalog containing proficiencies, job types, and projects) extracted from multiple sources using structural relationships and derived relationship triples (e.g., Project Web Server, Java, Uses) based on named entity extraction from text documents and databases that contain proficiency, project, and job information. The extracted information may be converted to a weighted graph that may vary over time both in terms of existence of nodes and edges, and in terms of the weights that change over time. The evolution of this (very large) graph may be followed over time using a bank of Structural Graph Recurrent Neural Networks based on Long Short Term Memory subunits as a model fit. The graph of future needs used with the time-varying temporal causal model may be used to fill the gaps in nodes and edges and update the weights assigned to the proficiencies.

Clustering subsystem 130 may be implemented using software executed by one or more processors, hardware, firmware, or combinations thereof, and is configured to collect data from data sources 105 and generate proficiency clusters used to evaluate candidates and employees. Clustering subsystem 130 may generate proficiency clusters using a proficiency catalog. The proficiency catalog may be developed manually by entering a list of proficiencies that employees may have. As another option, resumes can be analyzed to identify a catalog of proficiencies. For example resumes may be entered into data processing system 120, and the clustering subsystem 130 may extract data from the resumes to identify proficiencies and enter them into the catalog. For example, named entity recognition may be used and, in some embodiments, combined with disambiguation and synonym recognition to identify the proficiencies within the extracted data. Other data sources from which proficiencies may be extracted to generate the catalog may include job descriptions, projects, social media sources, directories, human capital management (HCM) databases, training or learning portals. As another option, known catalogs from other corporations, such as LinkedIn®, may be used to seed the proficiency catalog. The data sources from which the proficiency catalog is generated may include structured and unstructured data. The catalog may be segmented by industry, job category, and the like.

Once the proficiency catalog is generated, the proficiencies may be clustered using, for example, k-means clustering. The clusters may represent proficiencies relevant for a given job, job category, or role. The clustering may be based on latent semantic analysis (LSA) and a non-linear transformation of distance to relative standardized distances (based on a standard deviation driven distance, such as the known Bhattacharya or Mahalanobis distances) may be used with a combination of proficiency ontology distances, competence, and experience of the individual. In some embodiments, normalized distance measures may be used. Clustering algorithms may be used to generate the proficiency clusters. The clusters may be segmented using, for example, external information from social media, recruitment web sites, Fortune 500 industry segment information, and so forth. For each industry, the clustering may be taxonomy driven initially, which may evolve to thesaurus driven, and finally ontology driven when such ontologies become available for a given industry segment or specific to an enterprise. The clustering may include similarity graphs with proficiency hierarchy mapping, competency levels, and similarity scoring using distance measures to create proficiency similarity scores. The proficiency similarity scores may be between employees and potential applicants, for example. As another example, the proficiency similarity scores may be between potential job roles and potential upcoming projects.

Any given cluster may be for a single job category (or job title, job role, or the like) may contain multiple proficiencies that are desirable for that job category. The clusters may be stored in a database, for example, and labelled with the associated job category. The proficiencies within the cluster may each be related to one another at least by virtue of belonging to the same job category. For example, the proficiencies desired in a software developer may differ from those desired in sales manager. A proficiency cluster for a software developer may include proficiencies such as Java, Hadoop, efficient, team oriented, and the like. A proficiency cluster for product manager may include personal interaction competence, product knowledge, efficiency, management experience, and the like. As shown by this example, the proficiency cluster for a sales manager may overlap with that of a software developer. For example, proficiency in efficiency is in both proficiency clusters. Further, the proficiency clusters may be sub grouped to identify nested categories of proficiencies. For example, a manager cluster may include proficiencies that are desirable generally for managers, but subcategories of sales managers, product managers, and the like may include other, more specific proficiencies. The nested clusters directly help identify a set of clusters or sub-clusters of proficiencies or job types needed to address problems in specific project types with the smallest degree of false overlap or inclusion of extraneous cluster elements, or sub-cluster elements into the project or job type, which keeps the clusters highly specific. The system of clusters and sub-clusters is akin to a domain ontology or WordNet synsets, albeit one derived directly from the data rather than being hand-curated by human experts, and serves as a Proficiency Knowledge Base. The existing approach of having just one or two levels of clusters is problematic as it forces generation of "contaminated" clusters with elements which do not necessarily belong together but are forced together by the clustering algorithms used with the cluster element being closer to one super-cluster than another. The nested clusters disclosed herein solve that problem.

The proficiencies within a proficiency cluster may be weighted and scored to identify those proficiencies that are more valuable within the cluster. The weighting and scoring may be based on internal and/or external data regarding compensation for the job category associated with the cluster, project costs for projects needing the type of employee that has the proficiencies within the job category associated with the cluster. A linear regression model may be used, for example, to weight the proficiencies in any given cluster based on, for example, frequency of the proficiency appearing within analyzed resumes, the rarity of a proficiency internally or externally, the demand for the proficiency internally or externally, and the like. Further, the weight of a proficiency in one cluster may be different from the weight applied to the proficiency in a different cluster. For example, the weight of efficient in the software developer cluster may be different than the weight of efficient in the product manager cluster.

Gap identification subsystem 135 may be implemented using software executed by one or more processors, hardware, firmware, or combinations thereof, and is configured to use the models from modelling subsystem 125 and the proficiency clusters from clustering subsystem 130 to identify proficiency gaps. For example, the time-varying, multi-dimensional temporal causal models may be executed or simulated to forecast gaps in proficiencies due to reasons including but not limited to the extent, quality or lack thereof in talent sourcing, training/certification, availability of individuals, risk of talent flight (deep learning models for attrition), financial costs, and risk to revenue.

Gap identification subsystem 135 may also use the proficiency clusters to analyze existing employees to identify whether existing employees are superior, average, or below average as compared to others within the enterprise and/or within the industry. Such knowledge can be used to identify retraining, hiring, or termination efforts.

Recommendation subsystem 140 may be implemented using software executed by one or more processors, hardware, firmware, or combinations thereof, and is configured to use the identified gaps from gap identification subsystem 135 and the models from modelling subsystem 125 to generate recommendations for remedying the identified gaps. The remedies are sought with certain boundary conditions defined by the end users for variables that they are able to directly influence such as, for example, the maximum number of employees that can be retrained in a given time period, hiring pipeline capacity, the minimum time taken by an employee to switch projects, the maximum time projects can wait for an employee to reskill, percentage changes in compensation permissible based on proficiencies, and the like. Boundary condition constrained simulations (such as Monte-Carlo simulations) may be used with the time-varying multi-dimensional temporal causal model (based on, for example, Granger causality), to generate values for given parameters (what-if scenarios to generate predictions). The simulations may be used to find the shortest path to a positive outcome for variables such as revenue, profit, project execution, project production, and the like using stochastic gradient ascent (finding the fastest path to the positive outcome). The top n (e.g., five) shortest paths may be presented to the end user as possible recommendations that include the impact of each and explanations of the actions to implement. For example, the number of employees to retrain/cross-train/reskill on a specific proficiency can be recommended with values indicating a percentage of the proficiency gap with and without the retraining. Examples of recommendations are provided in user interfaces 400, 500, 600, and 700.

Recommendation subsystem 140 may also use the proficiency clusters to analyze candidates for jobs. If various proficiencies are lacking within an enterprise, hiring a candidate that helps fill those gaps, even if the proficiencies are not necessarily specific to the job for which the candidate is being considered, can be helpful to the enterprise. The time-varying, multi-dimensional temporal model generated by modelling subsystem 125 may be used to identify gaps within the enterprise. Candidate resumes may be entered into the data processing system 120 and analyzed with respect to the identified gaps from the model. Those resumes that rank highly with respect to the identified gaps may be highlighted for further consideration for users, who then do not have to manually sift through resumes of hundreds of candidates to identify those that have proficiencies needed within the enterprise. Additionally, candidates that may otherwise not be considered because the resume was only reviewed by a product manager with a specific need in mind may be highlighted.

Recommendation subsystem 140 may also use the proficiency clusters to score existing employees within an enterprise. The proficiencies of the employee may be known, and performance information about the employee from reviews and the like may be used to identify the employee's competence for a given proficiency. This information can be used with the weighted values of the proficiencies in the proficiency clusters.

Notification subsystem 145 may be implemented using software executed by one or more processors, hardware, firmware, or combinations thereof, and is configured to generate notifications based on the severity analysis subsystem 140 outputs. For example, gap identification subsystem 135 may output proficiency gaps above a threshold that may be sufficient to generate a notification, which may be sent via short message service (SMS) messaging using natural language generation to users that are configured to receive such notifications. In some embodiments, the notifications may appear to the user on their graphical user interface when the user logs into the graphical user interface. For example, notifications may appear within, for example, user interfaces 400, 500, 600 and/or 700 when a user logs into a user interface.

Graphical User Interface (GUI) subsystem 150 may be implemented using software executed by one or more processors, hardware, firmware, or combinations thereof, and is configured to generate a GUI for users of user system 110 to view the proficiency gap analysis performed by the subsystems of data processing system 120 described above. For example, the user interfaces 400, 500, 600, and 700 may each be a GUI for the user to see the gap forecasts and recommendations. This information may be used by the user to accordingly act on the forecasts and recommendations to avoid missing deadlines and being short-staffed.

Data processing system 120 depicted in FIG. 1 is merely an example and is not intended to be limiting. One of ordinary skill in the art would recognize many possible variations, alternatives, and modifications. For example, in some implementations, data processing system 120 may have more or fewer components than those shown in FIG. 1, may combine two or more components, or may have a different configuration or arrangement of components. While only one data processing system 120 is depicted in FIG. 1 for purposes of simplicity, this is not intended to be limiting. A typical distributed environment generally includes multiple data processing systems, each configured to execute one or more applications.

Figure 2:
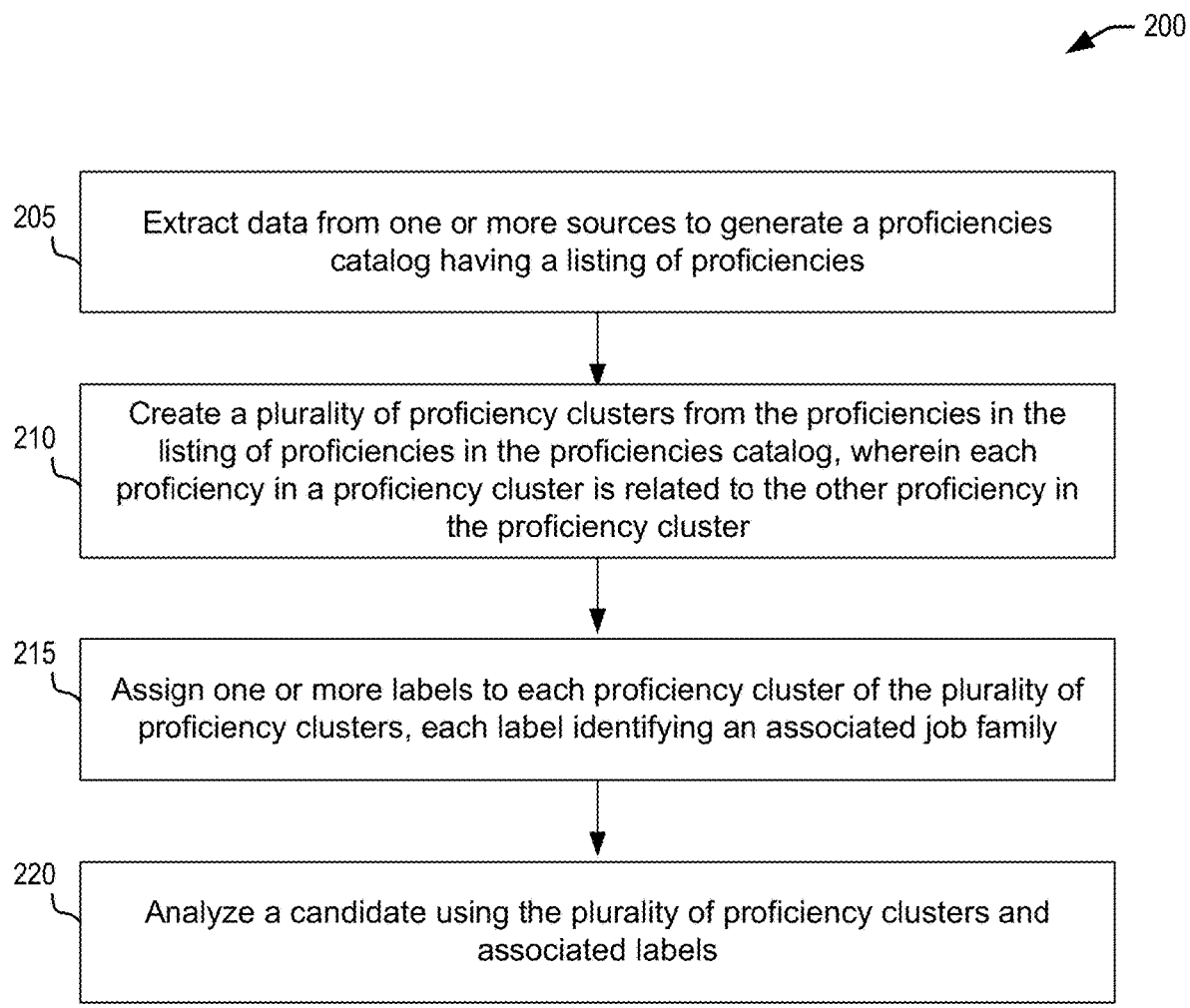
FIG. 2 depicts a simplified flowchart depicting a process for identifying gaps using proficiency clustering to evaluate employees and candidates according to certain embodiments.

FIG. 2 depicts a simplified flowchart 200 depicting proficiency cluster creation and use according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by data processing system 120.

As shown in FIG. 2, at step 205, the data processing system can extract data from one or more sources to generate a proficiencies catalog having a listing of proficiencies. The clustering subsystem 130 may be used as described in FIG. 1 to generate the proficiencies catalog. The proficiencies catalog may be listing of proficiencies that may be desirable within the enterprise, the industry, across all industries, and the like. In a cloud-based hosted system, a single proficiency catalog may be used for all hosted customers. In some embodiments, industry-specific catalogs may be used or customer-specific catalogs may be generated using the single large proficiency catalog created from multiple customers.

At step 210, the clustering subsystem 130, for example, may create a plurality of proficiency clusters from the proficiencies in the listing of proficiencies in the proficiencies catalog, where each proficiency in a proficiency cluster is related to the other proficiency in the proficiency cluster. As described above, proficiency clusters may be generated using, for example, k-means clustering. The clusters may include any number of proficiencies from the proficiencies catalog. The proficiencies in a cluster may be related to one another because, for example, each proficiency is desirable for a given job category (or job title, or the like). The clusters may each be labelled with the associated job category at step 215. Further the clusters may be nested to create sub clusters in, for example, a hierarchical format.

At step 220, the data processing system 120 may analyze a candidate using the plurality of proficiency clusters and associated labels. As described above, the candidate may be a job candidate for a new or open position or the candidate may be an existing employee. In the case of the job candidate, for example, the resume for the candidate may be entered, and the proficiencies of the candidate extracted. The candidate can be scored using the proficiency clusters to identify whether the candidate ranks high, relatively with respect to other employees within the enterprise, on an industry basis, and the like. If the candidate has a high score, the candidate may be flagged, for example, to be further considered by the hiring manager. As another example, the candidate may be an existing employee. The employee may be scored using the proficiency clusters and given the known information about the employee from past performance reviews, trainings attended, and the like. The score of the employee may be evaluated to determine whether the employee is average, superior, or below average in relation to, for example, other employees in the enterprise, other employees in the employee's department, other employees in the industry, and so forth. The employee score may be used to identify training to help the employee, and it may inform hiring, promotion, compensation, and firing decisions, for example.

Figure 3:
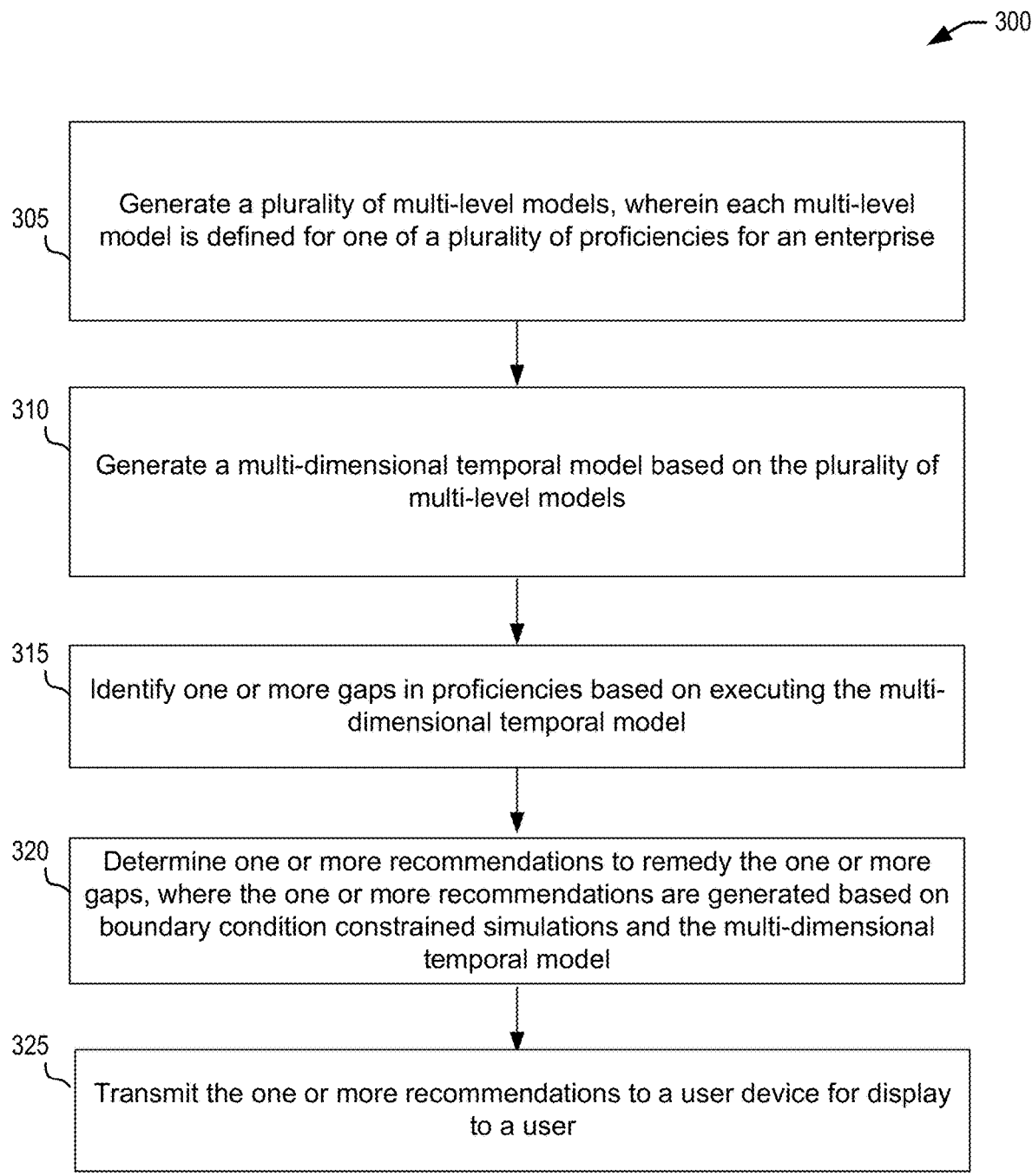
FIG. 3 depicts a simplified flowchart depicting a process for identifying gaps by creating a multi-dimensional temporal model to score employees according to certain embodiments.

FIG. 3 depicts a simplified flowchart 300 depicting model creation and use according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by data processing system 120.

As shown in FIG. 3, at step 305, the data processing system may generate a plurality of multi-level models, wherein each multi-level model is defined for one of a plurality of proficiencies for an enterprise. For example, modelling subsystem 125 may generate the multi-level models. As discussed above, the proficiencies may be outlined or listed in a proficiency catalog. The models may be generated using a combination of corporate goals, department levels goals, project level goals and corporate competitive analysis to determine requirements for proficiencies at different levels of competence. For example, summary of needs derived from the corporate goals may include or be identified using corporate project data, contracts for knowledge services, information technology services, operations models, and the like. For each proficiency, the model may identify the need for the proficiency of the enterprise at each level (i.e., department) within the enterprise. The model may be time dependent as well. For example, a model for the proficiency named Java may indicate that 90 man-hours are needed within the next month and 600 man-hours are needed within the next 6 months in aggregate, and details may indicate the breakdown of needs by specific projects, and further breakdown the need by sub-clusters below Java.

At step 310, the data processing system may generate a multi-dimensional temporal model based on the plurality of multi-level models. For example, modelling subsystem 125 may generate the temporal model. In some embodiments, the multiple multi-level models for each proficiency may be combined to identify a global model for the enterprise that is time-varying, which may be used to identify the needs of the enterprise for specific proficiencies based on time. There are multiple levels in these models as there are multiple levels of clusters of proficiencies, projects, and job types, and their mutual relationships. For example, a proficiency like Java may have many sub-skills (sub-proficiencies) which cluster together under different sub-skills clusters such as proficiency in several tools for cryptography (or networking or user interface or application servers or machine learning or any other proficiency), and each of these clusters have their own sub-clusters such as under machine learning there are sub-clusters of statistical APIs, clustering APIs, neural network APIs, data mining APIs, recommendation system APIs, forecasting APIs, and so forth. In some embodiments, a proficiency such as Java, for example, may cluster with other proficiencies like Apache Tomcat Server, Weblogic Server, and PL/SQL in a cluster (a super-cluster or set of sub-clusters) that is closest to the Database Programmer job cluster, which may have connections with other proficiency clusters that represent other proficiencies and proficiency clusters, such as those for different technology stacks, in this example. Similarly, projects clusters may be generated by the kinds of proficiency clusters they are associated with at multiple levels, and with job type levels.

Proficiencies, projects, and job types may vary by multiple dimensions including, for example, lines of business, location, size of business, levels of proficiency, cost of proficiency in the local market, availability of proficiency in the local market, timelines of projects, and availability of the proficiency internally.

The multi-level model creation may begin with a proficiency, projects, and job types catalog (i.e., a catalog containing proficiencies, job types, and projects) extracted from multiple sources using structural relationships and derived relationship triples (e.g., Project Web Server, Java, Uses) based on named entity extraction from text documents and databases that contain proficiency, project, and job information. The extracted information may be converted to a weighted graph that may vary over time both in terms of existence of nodes and edges, and in terms of the weights that change over time. The evolution of this (very large) graph may be followed over time using a bank of Structural Graph Recurrent Neural Networks based on Long Short Term Memory subunits as a model fit. The graph of future needs used with the time-varying temporal causal model may be used to fill the gaps in nodes and edges and update the weights assigned to the proficiencies.

At step 315, gap identification subsystem 135, for example, may be used to identify one or more gaps in proficiencies for the enterprise based on executing the multi-dimensional temporal model. Simulations of the multi-dimensional temporal model may identify proficiency gaps for the enterprise in various situations. For short-term goals, such as how short-staffed a factory may be over the next month may be generated. User interface 400, for example, provides a visual depiction example of this type of gap identification. Gap identification for long-term goals, such as the man-power needed (and missing) for a project may be generated. User interface 500, for example, provides a visual depiction example of this type of gap identification.

At step 320, recommendation subsystem 140, for example, may be used to provide recommendations for the gaps identified at step 315. In some embodiments, the recommendations are generated based on boundary condition constrained simulations and the multi-dimensional temporal model. These recommendations may be provided at step 325 to a user device. For example user interface 600 of FIG. 6 provides risk information in addition to recommendations.

As indicated above, the particular sequence or order of steps depicted in FIGS. 2 and 3 is not intended to be limiting. In certain alternative embodiments, the steps may be performed in some different order or some steps may also be performed in parallel. For example, while steps 315 and 320 are shown as occurring in a particular order in flowchart 300 in FIG. 3, this is not intended to be limiting. In alternative embodiments, these can occur in any order. In yet other embodiments, the processing steps 315 and 320 may overlap or may be performed in parallel.

Figure 4:
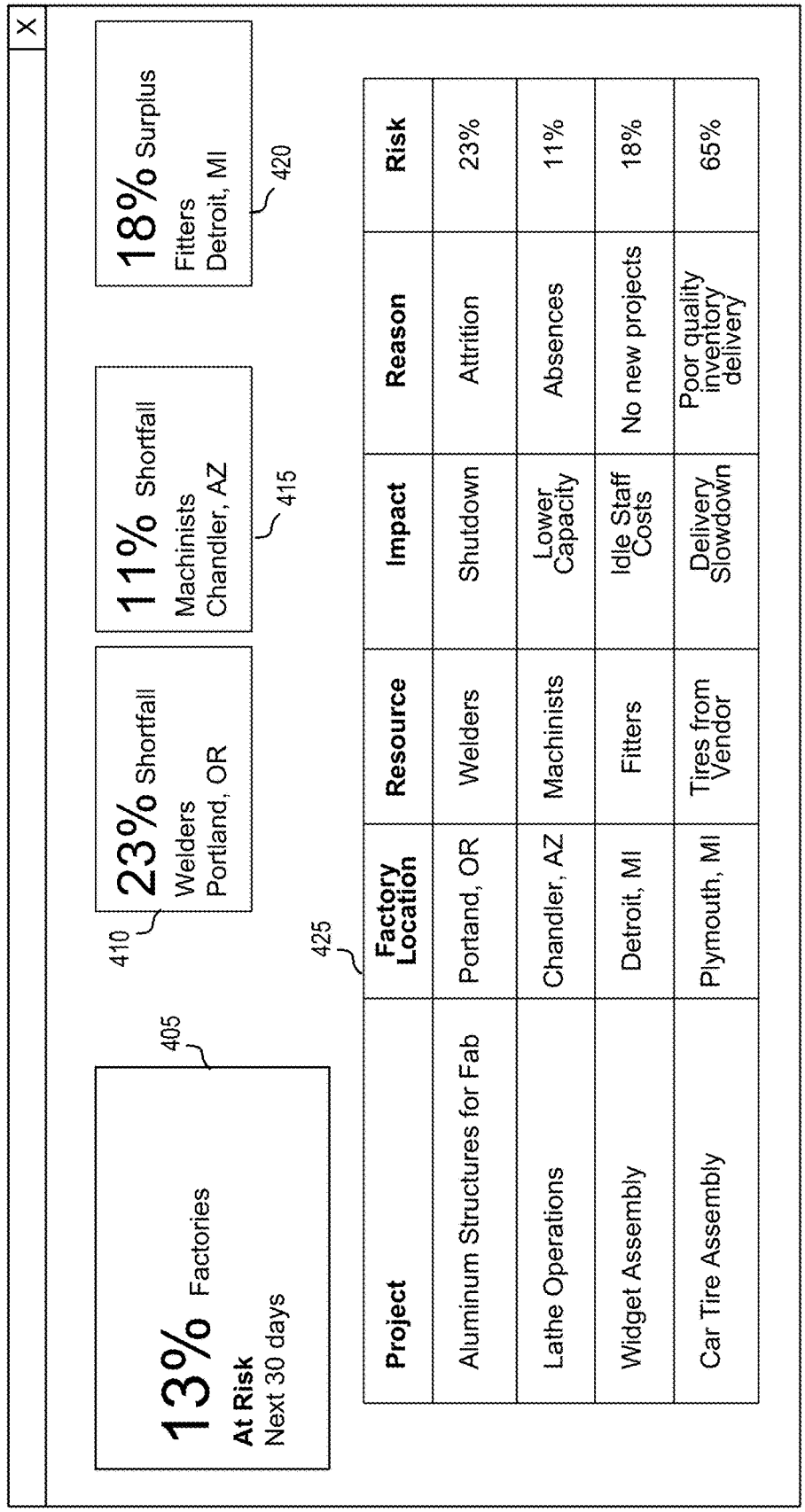

FIG. 4 illustrates an example user interface 400 depicting enterprise risk due to proficiency gaps. The gaps may be identified as described above, and the user interface 400 may be used by users to proactively see and remedy the gaps to avoid revenue drops, profit drops, factory shutdowns, and the like. For example, notification 405 can provide a high level notification summarizing the issues, which may be highlighted depending on the severity of the issue (e.g., severe (over a threshold) may be red, medium issues may be yellow, and low or no issues may be green). In this example, the summary notification 405 indicates that there is an overall 13% risk for factories within the enterprise over the next 30 days. In some embodiments, the time frame may be configurable for the user. Other configurations may include, for example, narrowing the information to a geographic region and/or department within the enterprise. Notifications 410, 415, and 420 may also be highlighted and provide more detailed information that is summarized by notification 405. For example, notification 410 indicates that there is a 23% risk of a shortfall of welders in Portland, Oreg. This information, as summarized, is over the next 30 days. Notification 415 indicates that there is an 11% risk of a shortfall of machinists in Chandler, Ariz. (also over the next 30 days). Notification 420 indicates that there is an 18% risk of a surplus of fitters in Detroit, Mich. over the next 30 days. Note that surplus information may be generated as a gap as well. The surplus information may inform hiring and/or firing decisions as discussed above.

Table 425 may provide further information about the notifications 405, 410, 415, and 420. For example, the first row entry in table 425 indicates that the project impacted is the Aluminum structures for fab project. The first row entry further indicates that the 23% risk is due to attrition and may result in a shutdown of the project. This risk may be considered high and accordingly the row entry in the table may be highlighted red like the notification 410.

The second row entry in table 425 may provide further information about notification 415, which indicates that the lathe operations project has an 11% risk of lower capacity due to absences. Similar information may be provided in table 425 for each notification 410, 415, and 420. The notifications and/or table entries may be sorted, for example, by the degree of risk and/or the severity of the impact. Further, in some embodiments, a user may select a notification and/or a row entry in a table to drill down into detailed information that was used to generate the notification and/or row entry.

Figure 5:
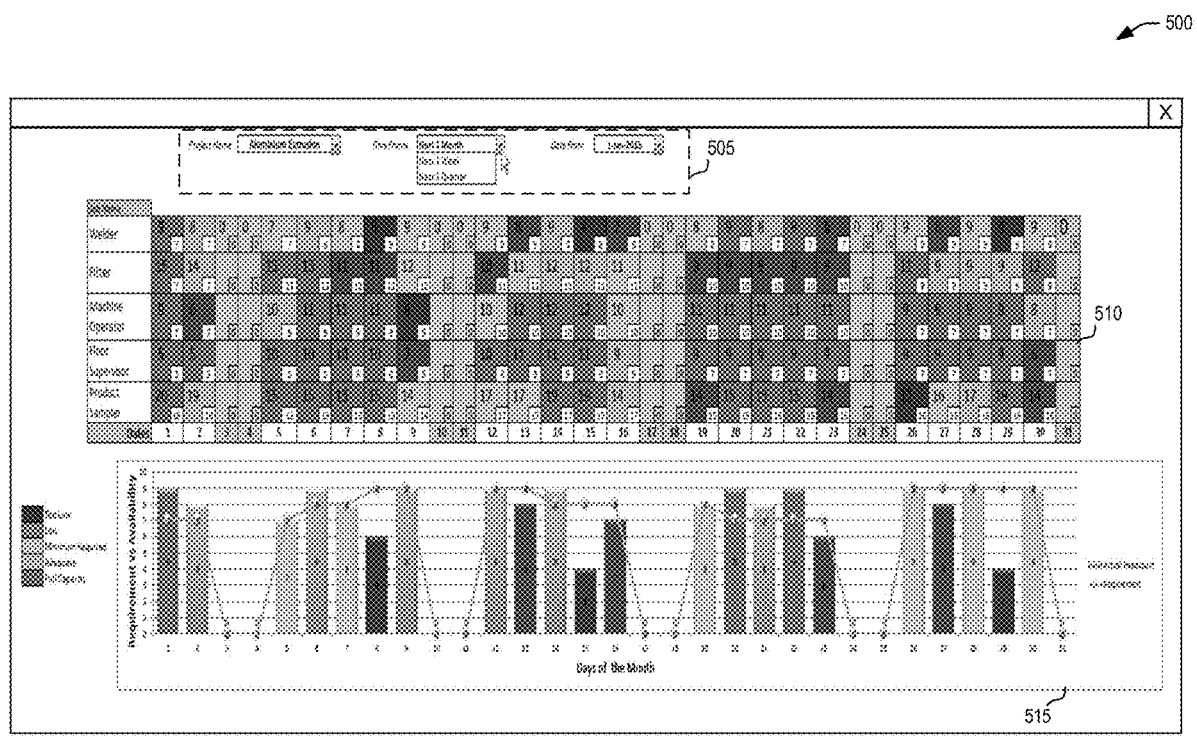

FIG. 5 illustrates an example user interface 500 depicting enterprise risk due to proficiency gaps. User interface 500 may include selection boxes 505. The selection boxes 5050 may be used to select specific parameters for configuring the displayed information in user interface 500. For example, a project, time period, and/or starting date may be selected. Other selection options may include, for example, factory or location identifiers, job categories, and the like. The selection options may be used to narrow or expand the information presented in user interface 500.

User interface 500 may include calendar view 510 that may visually depict, by job type (or any other categorization), the availability of workers for that date versus how many are needed. For example, the first row entry in calendar view 510 is for Welders. Each column indicates a day of the month. The first row entry for welders in column 1 (indicating the first day of the month) shows that 9 welders are available. The smaller number in the corner of the entry, in this example, indicates that 7 welders are needed. The entry may be highlighted or color coded to visually direct users to areas of concern. In this example, the first row entry (for welders) for the first column entry (for the first day of the month), may be green because there are sufficient welders available on that day for the need. This may be contrasted with the third row entry (for Machine Operators) on the second column entry (for the second day of the month), which may be highlighted in red because it indicates that 6 machine operators are available, but 7 machine operators are needed.

Graph 515 may further visually depict, by day of the week, headcount requirements versus headcount availability.

FIG. 6 illustrates an example user interface 600 depicting hiring trend gaps. The data used to populate the user interface 605 may be generated by data processing system 120 of FIG. 1, for example. The user interface 600 may include, for example, table 605. Table 605 may provide, separated by proficiency, information about hiring and a recommendation for each proficiency. For example, the first row entry of table 605 indicates that for the Java proficiency, the headcount needed is 50. The hiring rate is 8 (e.g., 8 hires per year), the attrition rate is 3 (e.g., 3 people leave per year), and the forecasted hiring gap is −5.5 (e.g., the enterprise will be short by 5-6 people with the Java proficiency over the next year). Based on the values and others for the java proficiency, the data processing system may provide a recommendation as discussed above with respect to recommendation subsystem 145 of FIG. 1. The recommendation for the Java proficiency shown in the first row entry of table 605 may be, for example, "HIRE." This recommendation may be more finely tuned in some embodiments to provide, for example, a recommended rate of hire over a timeframe (e.g., hire or train 1 employee for the Java proficiency every month for the next 6 months). The time frame associated with table 605 may be configurable by the user. For example, the information may be provided for a given week, month, year, and so forth. Table 605 may provide the hiring trends for a specific area of interest (e.g., by department, by factory, and the like) and, the hiring trend information shown in table 605 may be ranked such that, for example, the proficiencies facing the largest gaps are highlighted at the top of the table 605.

As shown in table 605, other recommendations may be provided depending on the information related to the proficiency. For example, the second row entry of table 605 indicates that the Big Data proficiency headcount needed may be 30. With a hiring rate of 10 and an attrition rate of 6, the data processing system may determine that the hiring gap is −14. The recommendation subsystem may indicate that "HIRE AT PREMIUM" is the recommendation, suggesting that paying a premium for employees with the big data proficiency is appropriate. This may be due, in part, to the rarity of the proficiency in the industry, for example.

Figure 7:
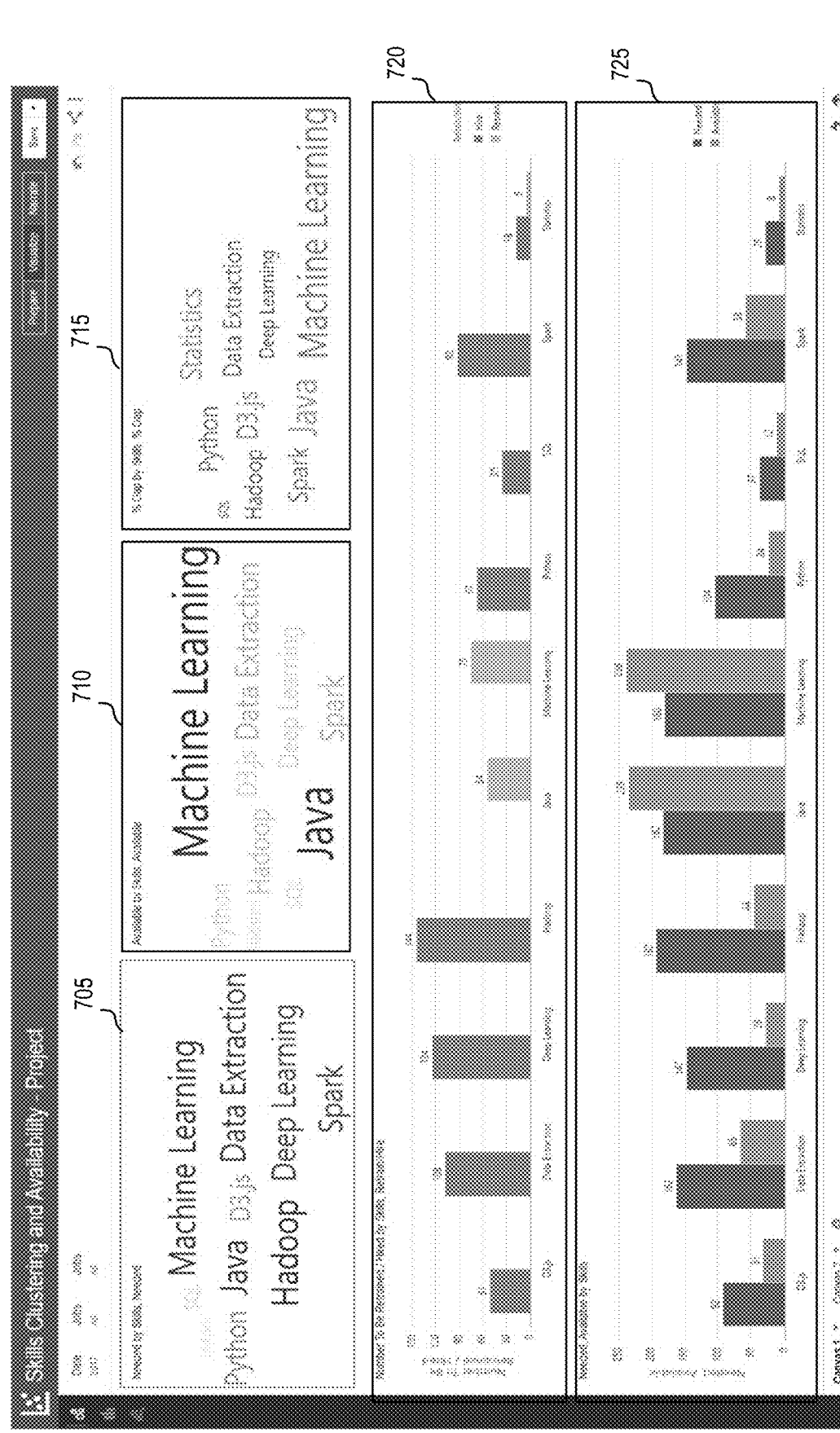

FIG. 7 illustrates another example user interface 700 depicting gaps and recommendations for given proficiencies. The gaps and recommendations for the given proficiencies shown in user interface 700 may be generated by data processing system 120 as described with respect to FIG. 1. User interface 700 may include tag cloud 705 that, for example, provides a visual depiction of the needed proficiencies. For example, the machine learning proficiency is in large font, indicating that it is highly needed. As another example, the SQL proficiency is depicted in a smaller (and lighter font in some embodiments), indicating that the SQL proficiency is needed, but not as severely as the machine learning proficiency. Tag clouds may provide the information using font size and/or color to visually depict the most important information to the user.

In user interface 700, tag clouds 710 and 715 may provide additional information to the user. For example, tag cloud 710 indicates the availability of the proficiency based on employee information in the enterprise. Tag cloud 710 indicates, for example, that the machine learning proficiency is highly available (as the font is quite large) as is the Java proficiency. The deep learning proficiency, as indicated in the tag cloud 710, is relatively less available than, for example, the machine learning proficiency. Tag cloud 715 may indicate, for example, the percentage gap for proficiencies. For example, in tag cloud 715, the machine learning proficiency is relatively large font, and green in color, indicating that there is a gap in the availability versus the need. However, the green color may indicate that the there is an over-availability of employees having the machine learning proficiency. The overage is supported by viewing the machine learning proficiency in tag cloud 710 (showing the availability), which is larger font than the machine learning proficiency in tag cloud 705 (showing the need). Tag cloud 715, as shown, indicates that the statistics proficiency % gap is relatively large and negative (due to red font).

User interface 700 may further include, for example, graph 720, which may indicate the number of employees to be hired or retrained by proficiency. For example, each bar in the bar graph 720 may be for a given proficiency. The height of the bar may indicate the number of employees to be hired or retrained. For example, the first bar (to the left) in the bar graph 720 may indicate, for example, that 51 employees should be hired with the D3js proficiency. The fifth bar in the bar graph may indicate, for example, that 54 employees should be retrained with the Java proficiency.

User interface 700 may further include graph 725, which may indicate, for example, the number of employees needed versus those available by proficiency. For example, each skill may have two bars in the bar graph 725. One bar for each proficiency may indicate the number of employees available with the proficiency and the second bar for each proficiency may indicate the number of employees needed with the proficiency. For example, the first proficiency in the bar graph 725 may be, for example, the D3js proficiency. The first bar for the D3js proficiency may indicate that 92 employees are needed, and the second bar for the D3.js proficiency may indicate that 31 are available. The hiring rate, attrition rate, and other factors may all go into the recommendation provided, for example, in graph 720 that indicates 51 employees should be hired with the D3.js proficiency. Each other proficiency of interest may be modeled (as described with respect to the modelling subsystem 125 of FIG. 1), analyzed for gaps (as described with respect to gap identification subsystem 135 of FIG. 1), and recommendations made (as described with respect to recommendation subsystem 140 of FIG. 1). The recommendations and other analysis used to generate the recommendations may be provided in the user interfaces 400, 500, 600, and 700, for example.

The infrastructure described above can be implemented in various different environments including a cloud environment (could be various types of clouds including private, public, and hybrid cloud environments), on-premises environment, a hybrid environment, and the like.

FIG. 8 depicts a simplified diagram of a distributed system 800 for implementing an embodiment. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various embodiments, server 812 may be adapted to run one or more services or software applications that enable identification of gaps in proficiencies for an enterprise and recommendations to remedy the gaps.

In certain embodiments, server 812 may also provide other services or software applications that can include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to access user interfaces, such as user interfaces 400, 500, 600, and/or 700 in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain embodiments. For example, one or more of the data repositories 814, 816 may be used to store information about the enterprise used to identify proficiencies and the gaps associated with them. In some embodiments, the gap results, scores, and recommendations may be stored in data repositories 814, 816. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data. The data repositories used by applications may be of different types such as, for example, a key-value store repository, an object store repository, or a general storage repository supported by a file system.

Figure 9:
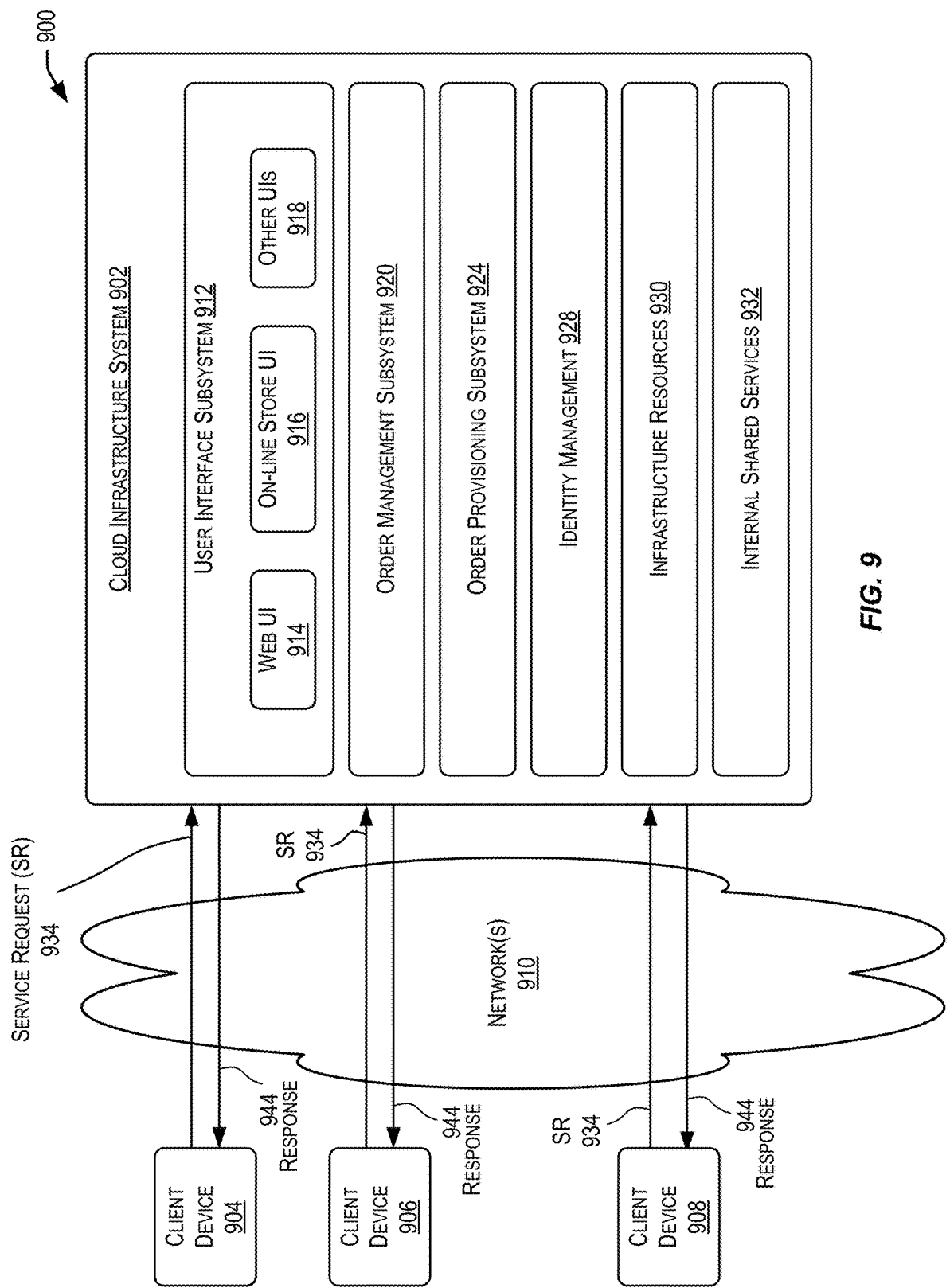
FIG. 9 is a simplified block diagram of a cloud-based system environment in which various storage-related services may be offered as cloud services, in accordance with certain embodiments.

In certain embodiments, proficiency gap-related functionalities described in this disclosure may be offered as services via a cloud environment. FIG. 9 is a simplified block diagram of a cloud-based system environment in which proficiency gap-related functionalities may be offered as cloud services, in accordance with certain embodiments. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, customers may subscribe to proficiency gap-related services that compute the proficiency gaps and recommendations and provide user interfaces for obtaining the results. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request a proficiency gap-related service described in this disclosure.

In some embodiments, the processing performed by cloud infrastructure system 902 for providing a proficiency gap-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining the proficiency gaps by analyzing the data and generating the models discussed above. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a proficiency gap-related service offered by cloud infrastructure system 902. As part of the order, the customer may provide information identifying data sources 105 for obtaining the data necessary to analyze.

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain embodiments, for a customer requesting the proficiency gap-related service, the response may include a link to a user interface, such as user interfaces 400, 500, 600, and/or 700.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
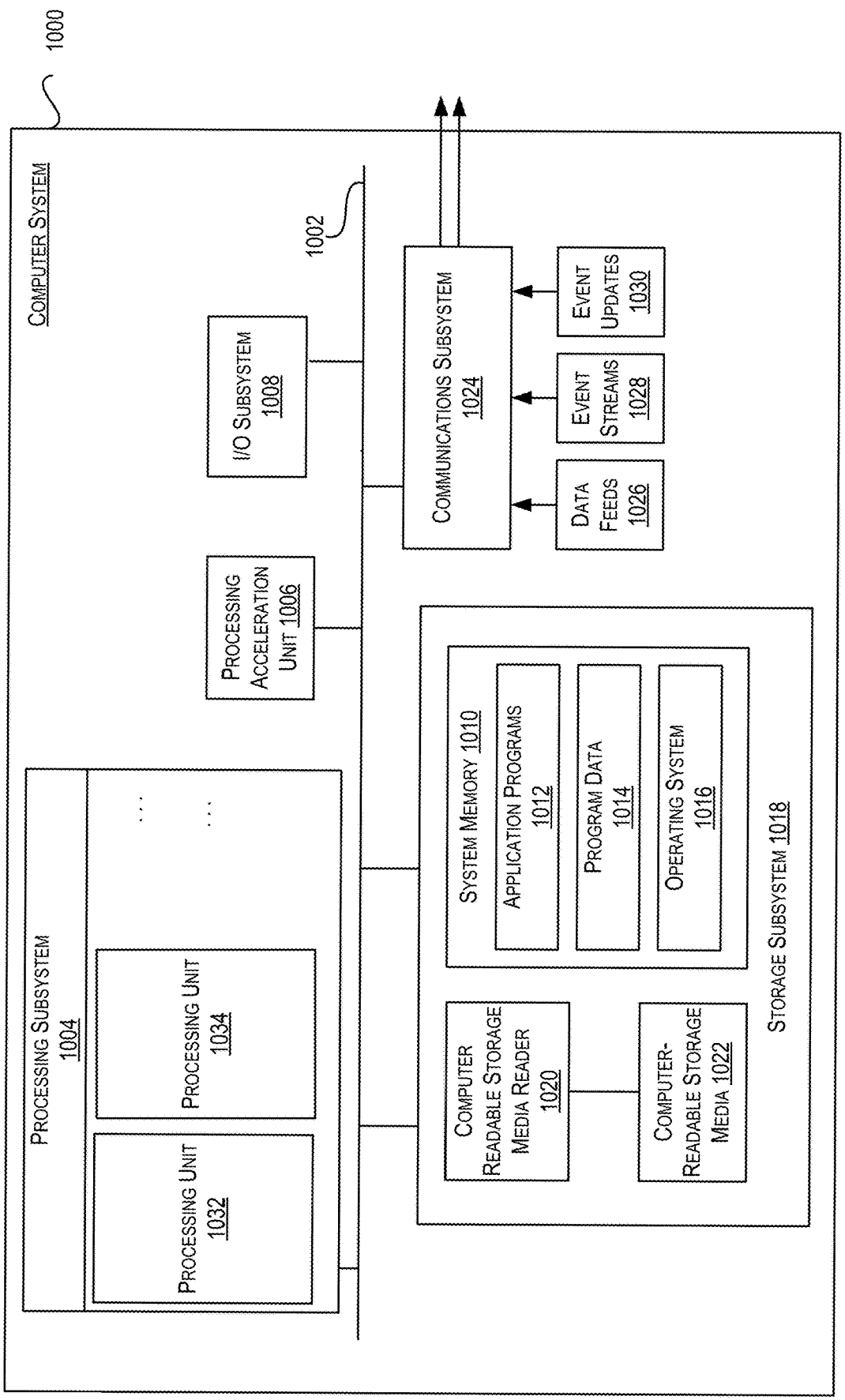
FIG. 10 illustrates an exemplary computer system that may be used to implement certain embodiments.

FIG. 10 illustrates an exemplary computer system 1000 that may be used to implement certain embodiments. For example, in some embodiments, computer system 1000 may be used to implement any the user systems 110, data processing system 120, and various servers and computer systems described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the communication subsystem may be used to allow data processing system 120, database 125, user systems 110, and/or data sources 105 to communicate with any of the other.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
generating, by a computer system, a plurality of multi-level models, wherein:
each multi-level model comprises a neural network that is trained using a machine-learning process to approximate partial differential equations-based proficiency gap computations for one of a plurality of proficiencies for an enterprise; and
the enterprise comprises a plurality of individuals;

generating, by the computer system, a multi-dimensional temporal model based on the plurality of multi-level models;
identifying, by the computer system, one or more gaps in proficiencies for the enterprise as a whole based on executing the multi-dimensional temporal model;
determining, by the computer system, one or more recommendations to remedy the one or more gaps, wherein the one or more recommendations are generated based on boundary condition constrained simulations and the multi-dimensional temporal model; and
transmitting, by the computer system, the one or more recommendations to a user device for display to a user.

2. The method of claim 1, wherein identifying the gaps in proficiencies comprises:
predicting, by the computer system, a number of employees to retrain.

3. The method of claim 1, further comprising:
calculating, by the computer system, a risk based on the one or more gaps.

4. The method of claim 1, wherein the plurality of multi-level models are generated using a combination of goals at a plurality of levels of the enterprise and competitive analysis.

5. The method of claim 1, wherein the plurality of multi-level models define enterprise needs for proficiencies at one or more levels of competence.

6. A non-transitory computer-readable memory storing a plurality of instructions executable by one or more processors, the plurality of instructions comprising instructions that when executed by the one or more processors cause the one or more processors to perform processing comprising:
generating a plurality of multi-level models, wherein:
each multi-level model comprises a neural network that is trained using a machine-learning process to approximate partial differential equations-based proficiency gap computations for one of a plurality of proficiencies for an enterprise; and
the enterprise comprises a plurality of individuals;
generating a multi-dimensional temporal model based on the plurality of multi-level models;
identifying one or more gaps in proficiencies for the enterprise as a whole based on executing the multi-dimensional temporal model;
determining one or more recommendations to remedy the one or more gaps, wherein the one or more recommendations are generated based on boundary condition constrained simulations and the multi-dimensional temporal model; and
transmitting the one or more recommendations to a user device for display to a user.

7. The non-transitory computer-readable memory of claim 6, wherein the instructions for identifying the gaps in proficiencies comprise further instructions that, when executed by the one or more processors cause the one or more processors to perform processing comprising:
predicting a number of employees to retrain.

8. The non-transitory computer-readable memory of claim 6, wherein the instructions comprise further instructions that, when executed by the one or more processors, cause the one or more processors to perform processing comprising:
calculating a risk based on the one or more gaps.

9. The non-transitory computer-readable memory of claim 6, wherein the plurality of multi-level models are generated using a combination of goals at a plurality of levels of the enterprise and competitive analysis.

10. The non-transitory computer-readable memory of claim 6 wherein the plurality of multi-level models define enterprise needs for proficiencies at one or more levels of competence.

11. A system comprising:
one or more processors; and
one or more memory devices comprising instructions that, when executed by the one or more processors, cause the one or more processors to perform operations comprising:
generating a plurality of multi-level models, wherein:
each multi-level model comprises a neural network that is trained using a machine-learning process to approximate partial differential equations-based proficiency gap computations for one of a plurality of proficiencies for an enterprise; and
the enterprise comprises a plurality of individuals;
generating a multi-dimensional temporal model based on the plurality of multi-level models;
identifying one or more gaps in proficiencies for the enterprise as a whole based on executing the multi-dimensional temporal model;
determining one or more recommendations to remedy the one or more gaps, wherein the one or more recommendations are generated based on boundary condition constrained simulations and the multi-dimensional temporal model; and
transmitting the one or more recommendations to a user device for display to a user.

12. The system of claim 11, wherein identifying the gaps in proficiencies comprises predicting a number of employees to retrain.

13. The system of claim 11, wherein the operations further comprise calculating a risk based on the one or more gaps.

14. The system of claim 11, wherein the plurality of multi-level models are generated using a combination of goals at a plurality of levels of the enterprise and competitive analysis.

15. The system of claim 11, wherein the plurality of multi-level models define enterprise needs for proficiencies at one or more levels of competence.

* * * * *

UNITED STATES PATENT AND TRADEMARK OFFICE
CERTIFICATE OF CORRECTION

PATENT NO. : 11,238,409 B2
APPLICATION NO. : 16/147234
DATED : February 1, 2022
INVENTOR(S) : Gupta et al.

It is certified that error appears in the above-identified patent and that said Letters Patent is hereby corrected as shown below:

On the Title Page

On page 3, Column 1, Item (56) under Other Publications, Line 10, delete "at" and insert -- at: --, therefor.

In the Specification

In Column 16, Line 54, delete "D3js" and insert -- D3.js --, therefor.

In Column 16, Line 65, delete "D3js" and insert -- D3.js --, therefor.

In Column 16, Line 66, delete "D3js" and insert -- D3.js --, therefor.

In Column 24, Line 59, delete "Microsoft$^{Xbox}$®" and insert -- Microsoft Xbox® --, therefor.

Signed and Sealed this
Thirty-first Day of May, 2022

Katherine Kelly Vidal
*Director of the United States Patent and Trademark Office*